UNITED STATES PATENT OFFICE.

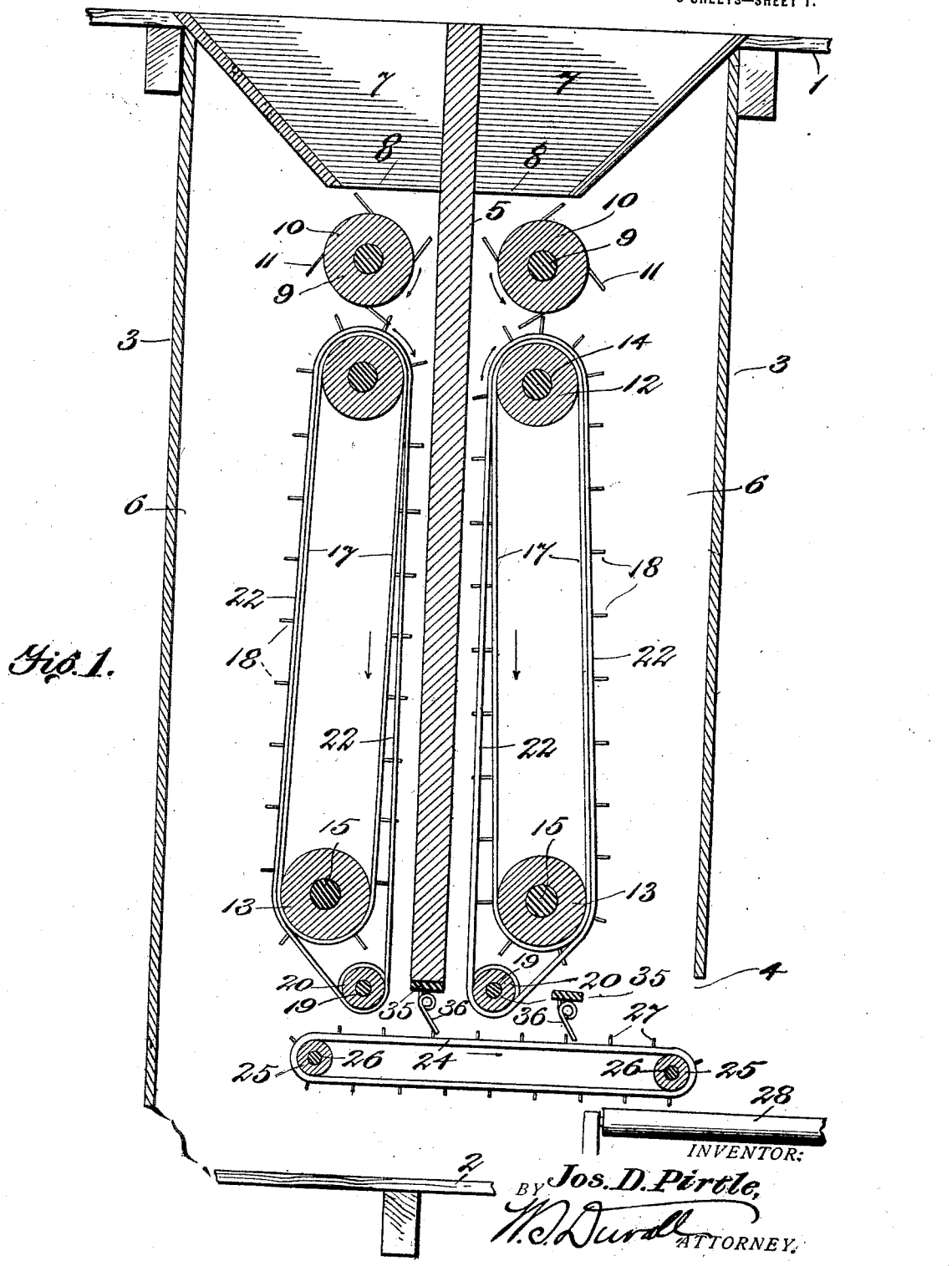

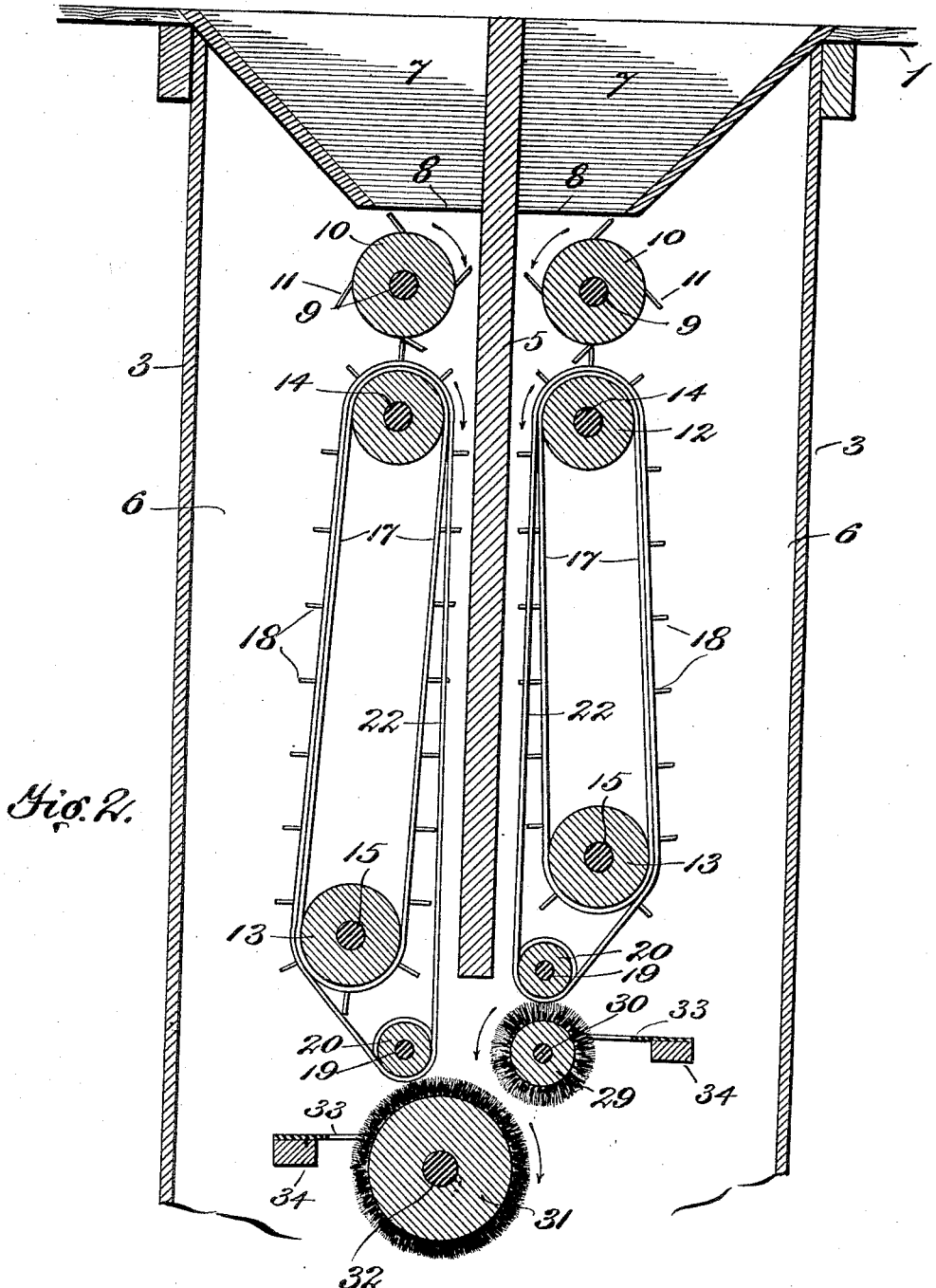

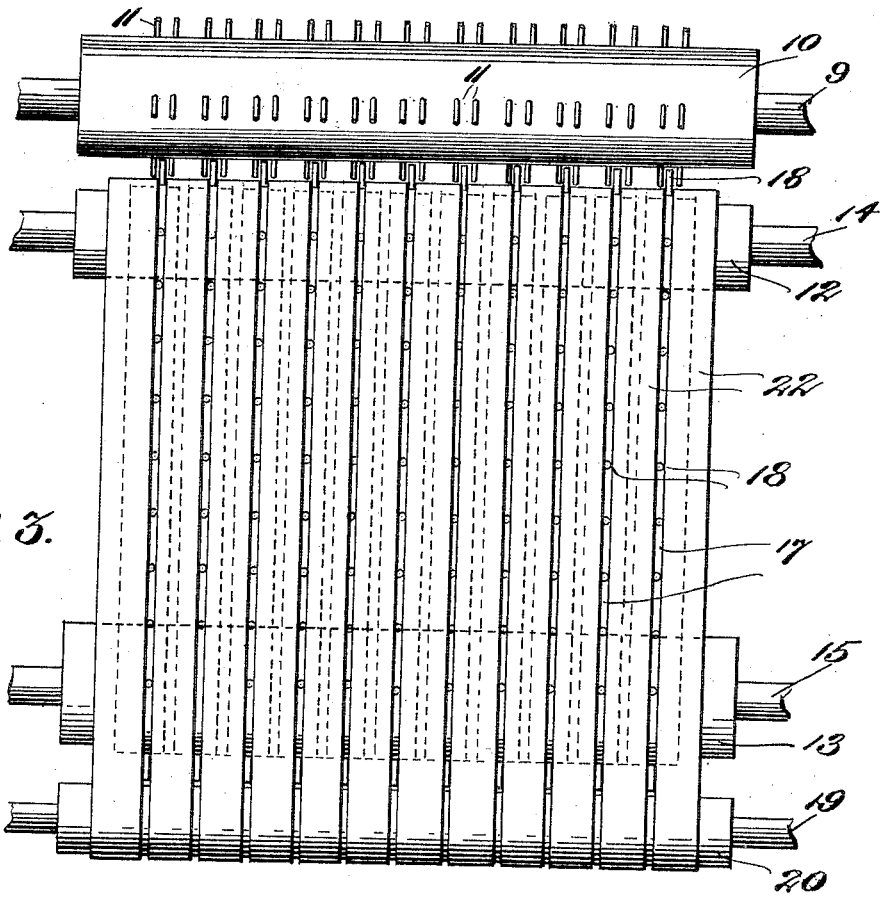
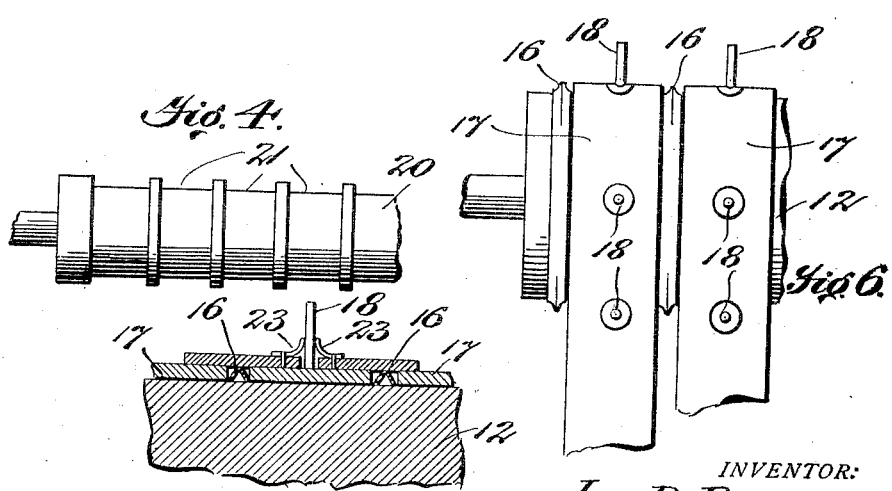

JOSEPH D. PIRTLE, OF CHICAGO, ILLINOIS.

WASTE-MAKING MACHINE.

1,319,486.   Specification of Letters Patent.   Patented Oct. 21, 1919.

Application filed May 9, 1919. Serial No. 296,043.

*To all whom it may concern:*

Be it known that I, JOSEPH D. PIRTLE, a citizen of the United States, residing at Chicago, in the county of Cook and State of Illinois, have invented new and useful Improvements in Waste-Making Machines, of which the following is a specification.

My invention relates to a machine or apparatus for making or forming waste employed for cleaning purposes, etc., by engineers, machinists, and others.

As is well known, waste is a combination of masses of threads of varying lengths and of different materials, the same being mixed together. In such mixing operations it is now customary to distribute the masses of the different materials in predetermined proportions over a floor-space and to subsequently manipulate by hand such distributed masses until the same become more or less commingled and intimately mixed, after which the waste thus formed is baled and ready for use.

The principal objects of my invention are to produce a comparatively inexpensive and simple machine or apparatus, preferably installed as a part of a building, though not necessarily so, and which is adapted to receive the several kinds of masses of thread usually composing the waste, thoroughly mix or commingle the same, and discharge the now formed mass of waste at the opposite end of the machine ready for use or for shredding or baling.

Other, though minor, objects of the invention will hereinafter appear, and the novel features thereof will be particularized in the appended claims.

Referring to the drawings:

Figure 1, is a vertical longitudinal sectional view of a machine or apparatus typifying my invention, the same being shown as installed in a building;

Fig. 2, is a similar view showing a second typification of the invention;

Fig. 3, is a side elevation of the principal rolls employed in the two typifications, the rolls being shown in their operative relative positions, and the belts employed in connection therewith;

Fig. 4, is a fragmentary view in elevation of the lower stripping-belt carrying-roll;

Fig. 5, is a sectional view of the upper feed-belt carrying-roll, the feed-belts and stripping-belts being shown thereon and in section; and Fig. 6, is an elevation of a fragment of the same roll, the stripping-belts being omitted and the feed-belts being shown.

Similar numerals of reference indicate similar parts in all the figures of the drawings.

As before indicated, I have herein illustrated my invention as installed permanently in a building and between two adjacent floors, designated as 1 and 2, but it will be obvious that the machine may be constructed separate from the building if desired.

The upper floor 1, in this instance, is provided with a suitable opening, preferably oblong, and surrounding said opening and extending to the lower floor 2, are vertical walls 3, thus forming a chute or casing for the apparatus. One of the walls 3, is provided at its lower end with a discharge-opening 4. The case or chute thus described may be divided into opposite vertical and similar compartments 6, by means of a vertical partition 5, extending from about the level of the upper floor 1 to a point some distance above the lower floor 2. At each side of the partition 5, in the floor 1, and therefore at the upper end of each of the compartments 6, I locate a hopper 7, the outer walls of which are inclined so as to discharge through openings 8, in the bottoms of the hoppers, toward the partition 5.

In each of the said compartments 6, immediately below the discharge-openings 8 of the hoppers, is located in suitable bearings, a transverse feed-roll shaft 9, upon which is mounted and adapted to move therewith, a feed-roll 10. This feed-roll is provided at intervals upon its surface with pairs of annularly alining fingers 11, inclined tangentially with relation to the roll and in opposition to the direction of rotation of said roll, as indicated by the arrows.

Paralleling the shafts 9 and vertically alining therewith, are transverse shafts 14, each carrying a belt-roll 12. Similar shafts 15, carrying similar rolls 13, are located some distance below the shafts 14 and rolls 12, and outside of a vertical line drawn through the shafts 14, so that the rolls 13 are somewhat farther from the central partition 5 than are the shafts 14.

The surfaces of the rolls 12 and 13 may be grooved or otherwise subdivided, as for instance, by the annular ribs 16, for the accommodation of the series of feed-belts 17, designed to be carried by the rolls 12 and 13 and to be maintained in their relative positions by means of such. If preferred, in lieu of employing a series of spaced-apart belts 17, there may be employed a single wide belt or apron, a change that will readily suggest itself, in which case the rolls 12 and 13 need not be subdivided on their surfaces as described. But whether the separate or single belts be employed, the same are at intervals provided with a series of equi-distant teeth or fingers 18, the same alining with the spaces between the pairs of teeth 11 of the feed-roll 10 and therefore designed to pass between the same as the two sets of rolls revolve in reverse directions. The pins or fingers 18 are of such length as will cause their outer ends to travel in close proximity to the surfaces of the rolls 10 and when passing about the rolls 12 to travel similarly close to the vertical partition 5; but as the shafts 15 and their rolls 13 are farther away from said partition than are the upper shafts 14 and their rolls 12, said fingers will recede from the partition as they descend with the belts upon which they are mounted and which travel in the direction indicated by the arrows. These belts, in the present instance, being independent will slip more or less upon the rolls upon which they are mounted, and as a result, they will not travel absolutely in unison, some of the belts moving slowly while others will move somewhat faster. The pins or fingers, therefore, of the belts will not maintain their transverse alinement as illustrated in Fig. 3, the nonuniform travel of the belts serving an important function in the machine, as will hereinafter appear.

A short distance below the rolls 13 and positioned somewhat nearer the partition 5, are opposite shafts 19, carrying rolls 20, the surfaces of which are preferably grooved at intervals, as at 21, said grooves being at variance with the belts 17. Within the grooves 21 of the rolls 20, and passing about the rolls 12 and 13 and between the pins or fingers 18 of the latter, are stripper-belts 22. These stripper-belts surmount or inclose the belts 17, coming in close relation with the latter where they pass over the rolls 12 and receding gradually from said belts 17 as they descend from the rolls 12 to the rolls 20, this being provided for by positioning the lower shafts 15 farther away from the partition 5 than are the shafts 14, all as heretofore described. As the stripper-belts leave or recede from the feed-belts, which occurs as the inner sides or portions of the two sets of belts descend, it will be clear that the edges of the stripper-belts will scrape the opposite sides of each of the teeth or fingers 18, and to make such scraping operation complete, I may provide the edges of the stripping-belts with strips 23, forming wipers that will cling more closely to the teeth and thus clear the same of any adhering threads by the time said teeth reach the lowest point of their travel.

Thus far I have described constructions that are common to both typifications of my invention, but from here on they are somewhat different and therefore will require separate reference.

Referring first to Fig. 1, it will be seen that I locate under the rolls 20 a horizontally disposed endless mixing-apron 24, the same having upon its outer surface comparatively short pins 27, and supported upon rolls 25 moving with shafts 26. Below and mounted at an angle or otherwise with relation to the mixing-apron I may locate a conveyer-belt or apron 28, designed to conduct the waste as formed to any desired point for baling or other purposes.

From a cross-bar 35 located between the two rolls 20 may depend a series of teeth 36, the same being preferably spring-like and inclined somewhat in the direction of travel of the mixing-belt. These teeth terminate near the surface of the mixing-belt, and while they may be so arranged with relation to the teeth of the mixing-belt as will cause the latter teeth to pass between them, it is thought preferable to arrange them otherwise, so that as a result some of the teeth of the mixing-belt will pass between the spring-teeth 36 while others will engage the same. A similar bar 37 and teeth 38 may also be located between the discharge end of the mixing-belt and the outermost roll 20.

I may also provide the hoppers 7 with suitable guides and suitable partitions, so that the hoppers may be subdivided for the purpose of receiving the masses of different materials. This is done because some of the materials employed in the make-up of the waste are shorter than others and hence apt to feed more rapidly than such materials composed of longer threads.

In operation the several kinds of materials are introduced into the hoppers and fall through the discharge openings 8 thereof upon the rotating feed-rolls 10, where they are caught by the inclined fingers 11 and deposited upon the combined mixing and feeding-fingers 18 of the belts 17. Any threads caught by the fingers 11 are removed therefrom by the fingers 18 passing therebetween, so that all danger of the material balling upon the rolls 10 is avoided. The masses of materials after delivery by the rolls 10 are operated upon by the fingers 18 and carried by them to the mixing-belt or apron 24. Inasmuch as the belts 17 are bound to travel at different rates of speed, owing to the fact that they will slip to different degrees upon their rolls, it will be seen that the mass of material is subject to more or less of a twisting manipulation as it passes down to the mixing-belt, such manipulation being only limited by the lengths of the belts 17 and the degrees to which they may slip upon their supporting-rolls. Having thus been at least partially mixed during its travel through the machine, the masses at each side of the partition 5 are discharged upon the mixing-belt or apron 24. Here the masses are arrested in their movements by reason of the spring-teeth 36, being dragged therefrom and further mixed by means of the teeth 27 of the mixing-belt or apron, so that by the time the several ingredients have passed through the machine and delivered from the mixing-belt or apron they are thoroughly commingled and form the commercial waste ready for use.

In Fig. 2 of the drawings, I have omitted the mixing-belt or apron just described and substituted therefor other means for this purpose, although at this time I deem the mixing-belt or apron more preferable for the purpose. In the second construction referred to, I employ a brush-roll 29, mounting the same upon a shaft 30 immediately below the outermost of the shafts 19, and in order to permit of such an arrangement, and yet locate said brush-roll about opposite the innermost of the shafts 19, I position the outermost shaft 19 above the plane of its companion. The roll 29, it will be understood, is driven at a speed in excess of the rolls 12, 13 and 20, and is designed to catch the mass of more or less commingled threads descending at that side of the machine and cast them inwardly and upon a somewhat faster driven and larger brush-roll 31, carried by a shaft 32 located at substantially the center of the machine and designed also to receive the mass of more or less commingled threads from the inner arrangement of belts. The tumbling of the masses of threads received by the movements of the belts 17 and their fingers, together with the tumbling received by the rapid revolutions of the two brush-rolls, are deemed sufficient to form the waste, and the latter may be discharged from the roll 31 into any receptacle or form of conveyer.

In order to clear the brush-rolls 29 and 31 from adhering threads, any suitable means may be employed. In the present instance, I mount upon bars 34 adjacent each roll, combs 33, the ends of which interlace with the bristles of the brush and serve to disengage any adhering threads.

It will of course, be understood, that the ends of the several shafts mentioned extend outside of the casing of the machine and are there provided with suitable pulleys, the latter being connected by a proper system of belting as will cause the shafts and the rolls carried thereby to move in the directions indicated by the arrows and at proper relative speeds.

It will be obvious that a machine or apparatus having the principles described may be comparatively cheaply constructed for the purpose in view, and that by its use not only is a vast amount of floor space saved and rendered unnecessary, but also a great reduction in the cost of the commercial waste results by reason of the elimination of hand labor now necessary for mixing the masses of the several materials entering into the make-up of waste.

It is obvious that changes may be made in the details of my invention without departing from the spirit of the same or sacrificing any of its advantages and which will adapt said invention, if the same is not already so adapted, for other uses than that of mixing the ingredients of what is now known as commercial waste.

It will be understood that although the mechanism appearing at one side of the machine is duplicated at the opposite side, such is because of the fact that, generally speaking, there are four or more different kinds of threads that enter into the make-up of commercial waste. I may, therefore, omit one of these duplicate mechanisms where the same is not required and do not desire that I be understood as limiting the invention to the duplication shown.

Having described my invention, what I claim, is:

1. In a machine of the class described, the combination with a member providing a smooth unbroken surface, of a pair of rolls mounted adjacent thereto, a belt carried by said rolls and substantially paralleling the surface of said member, and teeth projecting from the belt toward the said surface of the member and adapted to travel in proximity thereover.

2. In a machine of the class described, the combination with a member providing a surface, said member being vertically disposed and stationary, of a pair of rolls mounted adjacent thereto and substantially vertically opposite each other, a belt carried by the rolls and substantially paralleling the surface of the member, and teeth projecting from the belt toward the said surface of the member and adapted to travel in proximity thereover.

3. In a machine of the class described, the combination with a vertically positioned member providing a smooth unbroken surface, of a pair of rolls mounted adjacent thereto and substantially vertically opposite each other, a belt carried by the rolls and substantially paralleling the surface of the member, teeth projecting from the belt toward the said surface of the member and adapted to travel downwardly in proximity thereover, and laterally disposed mixing and delivering-means supported below and adapted to take the discharge from said belt.

4. In a machine of the class described, the combination with a vertically positioned stationary member providing a smooth unbroken surface, of a pair of rolls mounted adjacent thereto and substantially vertically opposite each other, a belt carried by the rolls and substantially paralleling the surface of the member, teeth projecting from the belt toward said surface of the member and adapted to travel downwardly in proximity thereover, means for stripping said teeth when they reach their lower point of travel, and laterally disposed delivering-means supported below the stripping-means and adapted to take the discharge therefrom.

5. In a machine of the class described, the combination with a member mounted to provide a surface, of rolls positioned adjacent thereto, and a plurality of independent belts carried by the rolls and provided with teeth adapted to travel over said surface and means for causing said belts to travel at varying rates of speed.

6. In a machine of the class described, the combination with a member mounted to provide a vertical surface, of upper and lower rolls mounted to revolve adjacent said surface, and a series of independent endless belts carried by the rolls each provided with teeth outstanding therefrom and terminating adjacent the surface.

7. In a machine of the class described, the combination with a member mounted to provide a surface, of a series of independent endless belts having outstanding teeth disposed adjacent said surface, and means for causing said belts to travel at different rates of speed.

8. In a machine of the class described, the combination with a member mounted to provide vertical surface, of upper and lower rolls adjacent the same, a series of independent endless belts carried by the rolls, means for causing them to travel at varying rates of speed, teeth carried by the belts and terminating adjacent said surface, and a delivery means below the belts.

9. In a machine of the class described, the combination with a member mounted to provide a surface, a pair of rolls adjacently mounted and a toothed belt operating thereover, of stripping-belts between the rows of teeth of the toothed belt and surmounting the latter and the rolls, and a belt roll for the stripping-belts, said latter roll being offset from the path of said toothed belt and adapted to deflect the stripping-belts from said toothed belt.

10. In a machine of the class described, the combination with a pair of rolls and a series of independent belts mounted thereon and provided with teeth, of a third roll mounted out of alinement with the pair of rolls, and a series of stripping-belts mounted upon the three rolls, overlapping the finger belts with which they alternate.

11. In a machine of the class described, the combination with a pair of rolls, of a series of toothed belts mounted thereon and adapted to travel at varying speeds, a surface adjacent the teeth of the belts and upon which said teeth operate, a third roll mounted out of alinement with the pair of rolls, and stripping-belts mounted upon the three rolls and located upon the first mentioned belts between the teeth thereof.

12. In a machine of the class described, the combination with a rotary feed roll provided with annularly alining pairs of teeth, of a lower pair of rolls operating adjacent and in opposition to the feed roll, a belt carried by the pair of rolls and provided with teeth alining and outstanding therefrom and adapted to pass between the pairs of teeth of the feed roll.

13. In a machine of the class described, the combination with a feed roll having annularly alining teeth arranged in pairs and inclined tangentially in opposition to the direction of rotation of the roll, of a pair of rolls, one of which is positioned adjacent the feed roll, a belt carried by the pair of rolls and adapted to travel contrary to the direction of travel of the feed roll, and teeth alining and outstanding from said belt and adapted to pass between the pairs of inclined teeth of the feed roll.

14. In a machine of the class described, the combination with vertical feeding means, of a laterally movable mixing apron having teeth extended therefrom and adapted to take the discharge from the feeding means, and a stationary retarding means located above the mixing apron and in rear of the discharging means.

15. In a machine of the class described, the combination with a vertically operating discharging means, of a laterally movable mixing apron having upwardly disposed teeth, and a toothed retarding means located above and depending to a point near the apron and in rear of the discharging means.

16. In a machine of the class described, the combination with a discharging means, of a laterally movable mixing belt provided with upwardly disposed teeth, and a retarding means supported above the same and in rear of the discharging means and provided with depending spring fingers.

17. In a machine of the class described, the combination with feeding means, of a laterally movable mixing apron arranged to take the discharge therefrom and provided with upwardly disposed teeth, and a retarding means supported above said apron and in rear of the discharging means and provided with spring teeth depending into the path of the teeth of said apron.

18. In a machine of the class described, the combination with a member providing a vertical surface, a hopper, a rotary feed below the hopper, a pair of rolls below the feed, and a series of toothed belts mounted to operate over said rolls at varying degrees of speed, of a laterally movable apron below the belts and provided with teeth projecting upwardly from the apron, and a yielding retarding means in rear of the belts and above the apron.

19. In a machine of the class described, the combination with a pair of rolls, and a series of independent belts mounted and adapted to travel thereon and each provided with outstanding teeth, the teeth of each belt alining, of a third roll mounted out of alinement with the pair of rolls, a series of stripper-belts mounted thereon and upon the pair of rolls and surmounting the toothed belts at each side of said teeth, and flexible wiping strips secured to the edges of the outer belts and bearing against the teeth of the inner belts.

20. In a machine of the class described, the combination with a vertical surface, upper and lower rolls adjacent thereto, the lower roll being a greater distance from said surface than the upper roll, a series of independent belts mounted on the rolls, and alining teeth projecting outwardly from each belt, of a roll below the lower roll of the pair and having its surface in vertical alinement with the upper roll of the pair, and a series of stripping-belts mounted over the three rolls and located between and impinging against the teeth of the series of belts first mentioned, whereby as the belts travel in the same direction the stripping-belts will recede from the teeth carrying belts and wipe or strip the teeth thereof.

21. In a machine of the class described, the combination with a central vertical partition, hoppers arranged at each side thereof, a toothed feed roll below each of the hoppers, a pair of rolls below each of the feed rolls and adjacent the partition, and toothed belts carried by said latter rolls, of a laterally discharging and operating mixing means adapted to receive discharges from each of said tooth belts below the lower end of said partition.

22. In a machine of the class described, the combination with a vertical partition, hoppers at each side of the same, rotary feeding means below each of the hoppers, pairs of rolls below each of the feeding means, and toothed belts carried by the rolls, of a laterally movable mixing apron arranged under and adapted to receive the discharges from the two belts below the partition, and retarding means located above said laterally movable mixing apron and between the discharge ends of the two belts and in rear of the outermost belt.

23. In a machine of the class described, and in combination with the upper and lower floors of a building, the upper floor having an opening, of a partition depending from said opening, hoppers at each side of the partition in said opening, a rotary feeding means below each of the hoppers, upper and lower rolls at each side of the partition below the feeding means toothed belts carried by the rolls, and a mixing means arranged below the belts and adapted to receive the discharge therefrom.

JOSEPH D. PIRTLE.

Copies of this patent may be obtained for five cents each, by addressing the "Commissioner of Patents, Washington, D. C."